United States Patent [19]
Hoffman

[11] 4,441,255
[45] Apr. 10, 1984

[54] HOLDER FOR SABER SAW BLADE

[76] Inventor: Simon J. Hoffman, P.O. Box 75821, Los Angeles, Calif. 90075

[21] Appl. No.: 230,966

[22] Filed: Feb. 2, 1981

Related U.S. Application Data

[62] Division of Ser. No. 62,606, Aug. 1, 1979, Pat. No. 4,285,129.

[51] Int. Cl.³ .............................................. B27B 19/09
[52] U.S. Cl. .......................................... 30/392; 279/71
[58] Field of Search .................... 30/392, 393, 394; 279/75, 81, 71, 80; 83/698

[56] References Cited

U.S. PATENT DOCUMENTS

| | | | |
|---|---|---|---|
| 2,627,882 | 2/1953 | Kleinsmith | 30/392 |
| 4,020,555 | 5/1977 | Hedrick | 30/392 |
| 4,204,692 | 5/1980 | Hoffman | 30/394 X |
| 4,285,129 | 8/1981 | Hoffman | 30/392 |

Primary Examiner—Jimmy C. Peters
Attorney, Agent, or Firm—John L. McGannon

[57] ABSTRACT

A holder of improved construction for mounting a saber saw blade on a drive means for reciprocation. The holder includes means defining a slot for receiving the blade, and means coupled with the support means for retaining the blade in the slot and for preventing movement of the blade relative to the support when the support and blade are reciprocating under the influence of the drive means. The holding means in several embodiments includes cam members which are received in notches in respective blades. Other embodiments relate to the formation of blade-receiving slots by moving wall means into proximity with recesses in side faces of elongated members.

1 Claim, 26 Drawing Figures

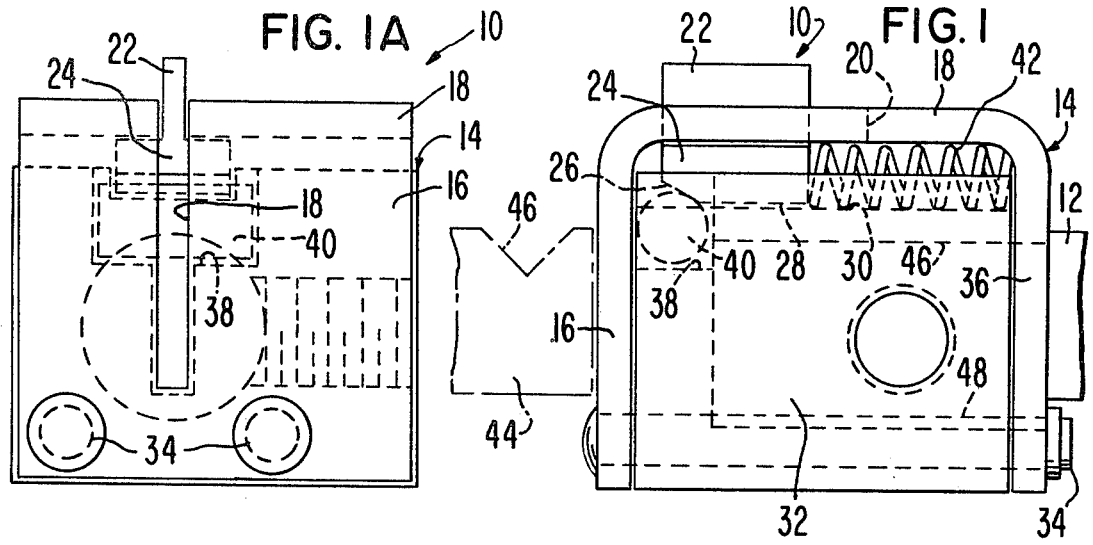
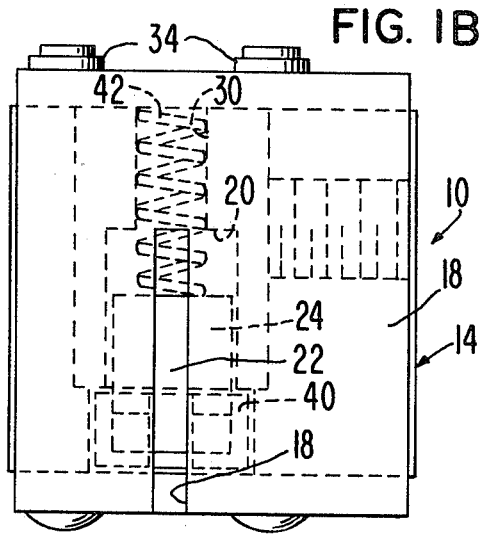
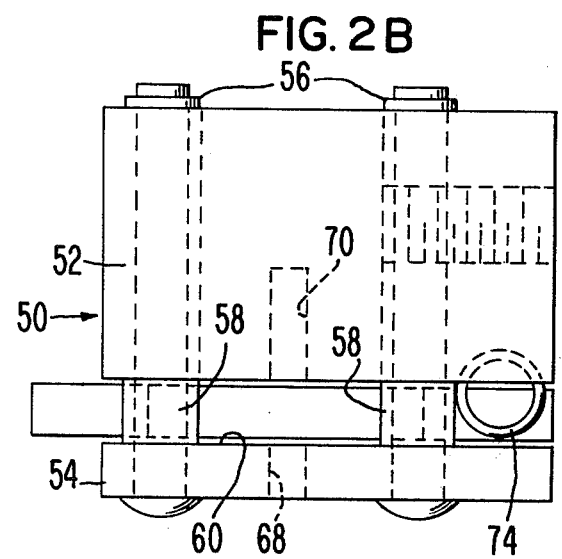
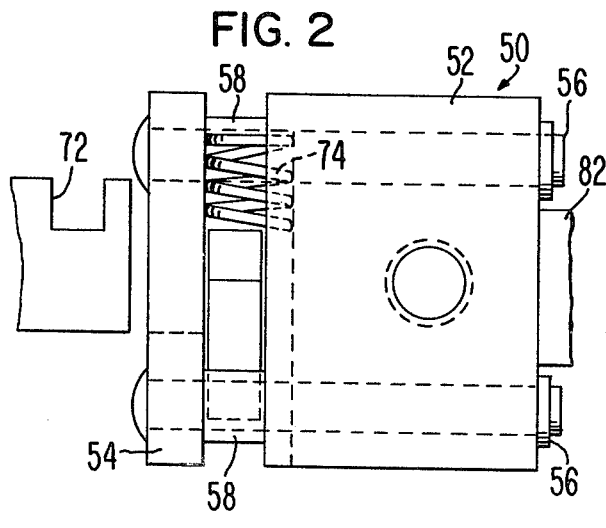
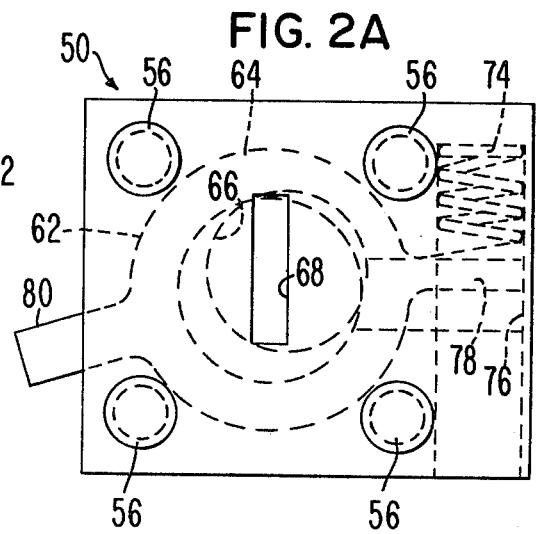

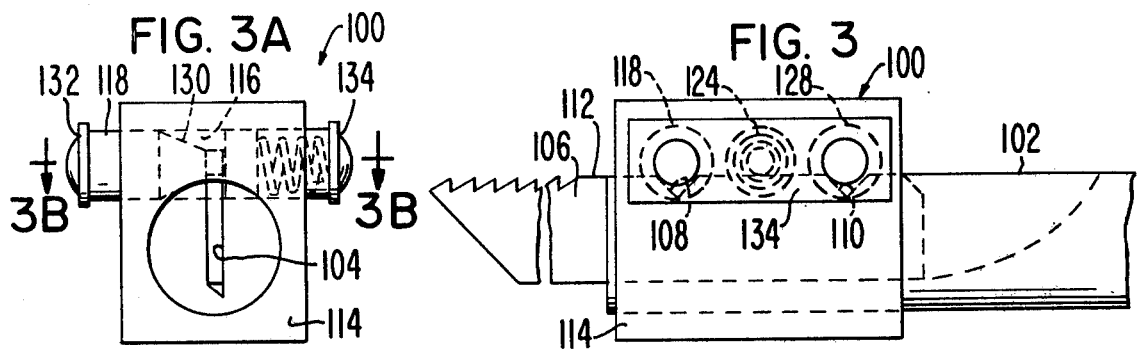
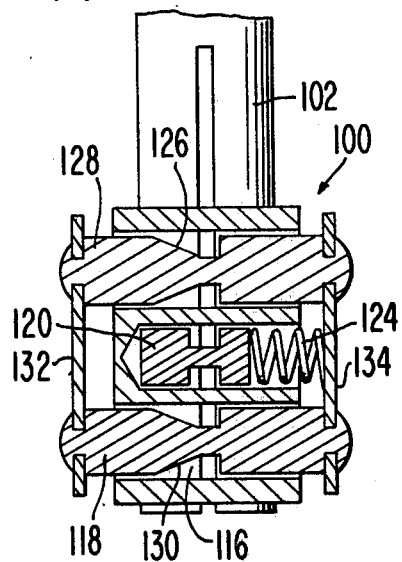
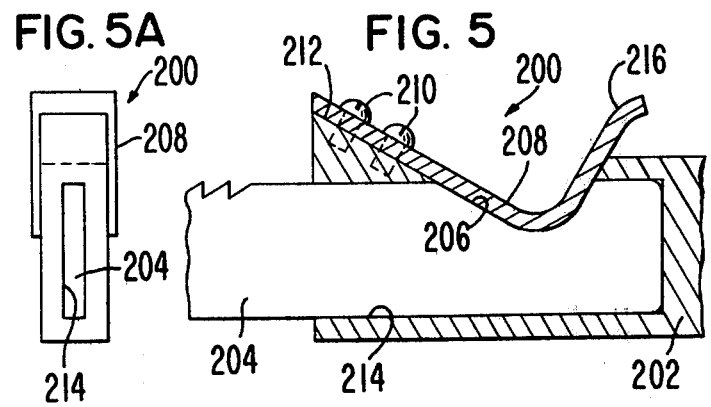
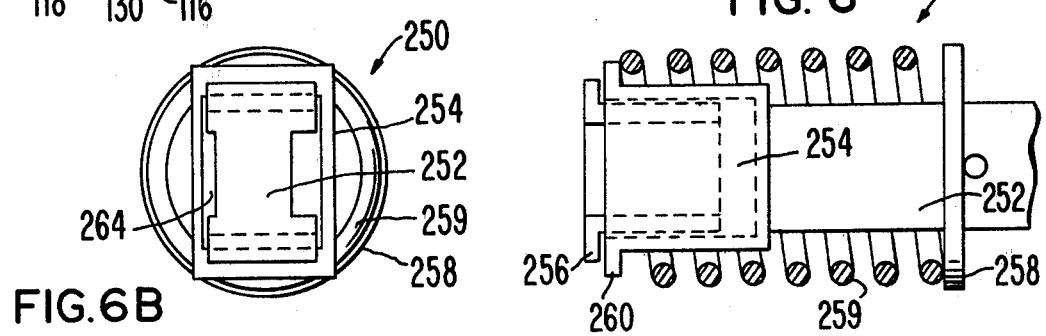
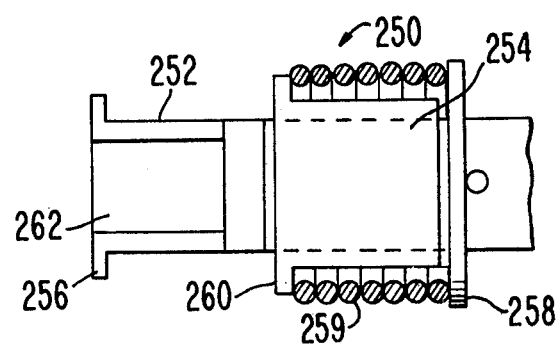

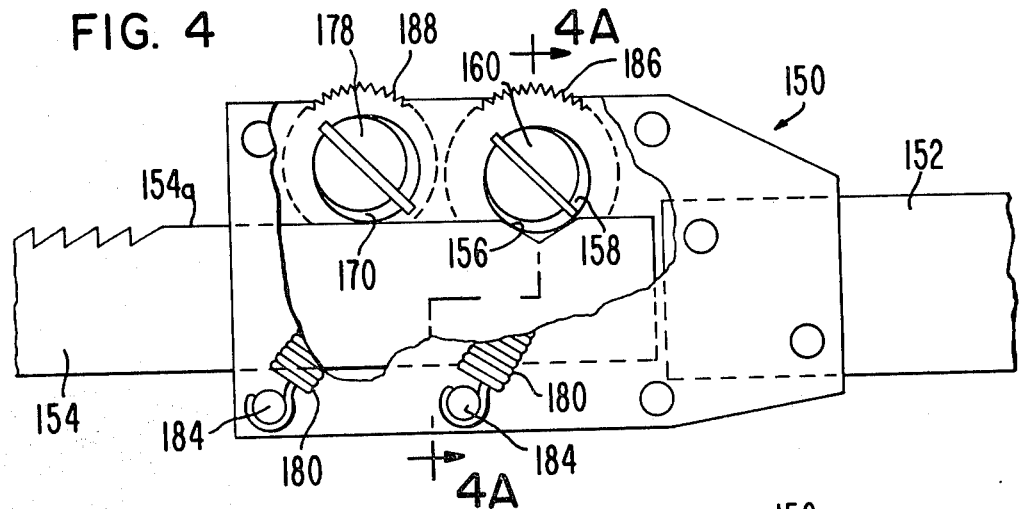
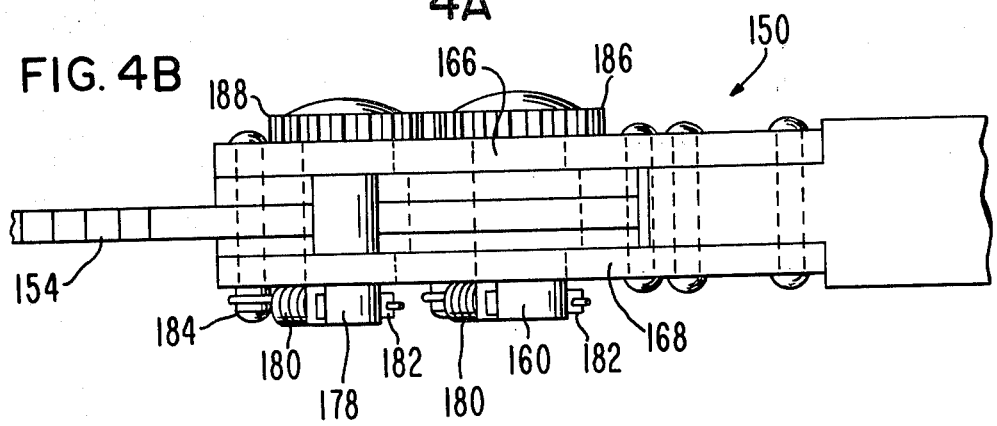
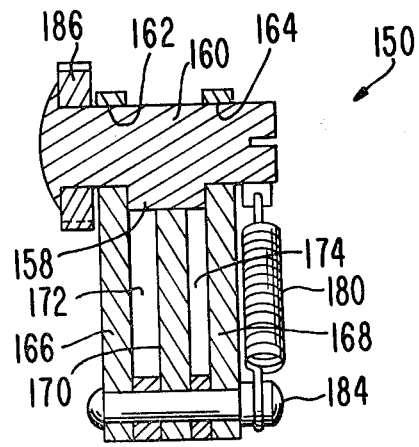

4,441,255

1

HOLDER FOR SABER SAW BLADE

This is a division of application Ser. No. 62,606 filed Aug. 1, 1979 now U.S. Pat. No. 4,285,129.

This invention relates to improvements in the holding of blades in saber saws and, more paticularly, to am improved holder for saber saw blades to prevent relative movement between the blade and the saber saw drive means.

BACKGROUND OF THE INVENTION

Improvements have been steadily made in the mounting of saber saw blades. Historically, a blade of this type was mounted originally by a set screw securing the blade to the reciprocating part of the saber saw. The screw, however, can become loose due to vibration and the connection between the blade and the reciprocating part is, therefore, not a firm one, thereby requiring that means other than set screws be provided.

Blade holders which have improved on the set screw concept have been disclosed in U.S. Pat. Nos. 3,750,283, 3,795,980, 3,823,473, 3,927,893 and 4,020,555. An additional disclosure of this type of holder has been made in U.S. application Ser. No. 902,198, filed May 2, 1978. Notwithstanding the blade holders in the foregoing references, it has been found that additional improvements can be made in holders for saber saw blades to further simplify the mounting of the blades and assure that the blades are firmly attached so as not to become broken or damaged during a sawing operation.

SUMMARY OF THE INVENTION

The present invention satisfies the aforesaid need by providing a holder of improved construction as set forth in a number of embodiments. All embodiments of the present invention provide a holder of simple and rugged construction, one which is easy to use and requires no special skills on the part of the user, and one which has a long useful operating life to thereby avoid replacement yet the device can be applied to an existing saber saw until without substantial modification thereto.

The primary object of this invention is to provide improvements in holders for saber saw blades, wherein the invention provides a holder which can be readily put to use, is easy to operate, and requires no special skill on the part of the user yet the holder can be used on new saber saws as well as those already in existance.

Other objects of this invention will become apparent as the following specification progresses, reference being had to the accompanying drawings for several embodiments of the invention.

IN THE DRAWING

FIG. 1 is a side elevational view of one form of the saber saw blade holder of the present invention;

FIG. 1a is a front elevational view of the holder of FIG. 1;

FIG. 1b is a top plan view of the holder of FIG. 1;

FIG. 2 is a view similar to FIG. 1 but showing another embodiment of the saber saw blade holder of this invention;

FIGS. 2a and 2b are front and top plan views, respectively, of the holder of FIG. 2;

FIG. 3 is a side elevational view of a third embodiment of the invention, showing a saber saw blade attached thereto;

FIG. 3a is a front elevational view of the holder of FIG. 3;

FIG. 3b is a cross-sectional view taken along line 3b—3b of FIG. 3a;

FIG. 4 is a side elevational view, partly broken away of another embodiment of the saber saw blade holder, showing a portion of a saber saw blade attached thereto;

FIG. 4a is a cross-sectional view taken along line 4a—4a of FIG. 4 with the saber saw blade removed;

FIG. 4b is a top plan view of the blade and holder of FIG. 4;

FIG. 5 is a vertical section through another embodiment of the saber saw blade holder of the present invention, showing a blade is held in place on the holder;

FIG. 5a is a front elevational view of the holder of FIG. 5;

FIG. 6 is a side elevational view, partly in section of another embodiment of the holder of this invention showing the holder in an closed condition;

FIG. 6a is a view similar to FIG. 6 but showing the holder in an open condition;

FIG. 6b is a front elevational view of the embodiment of FIG. 6;

Figure 7:
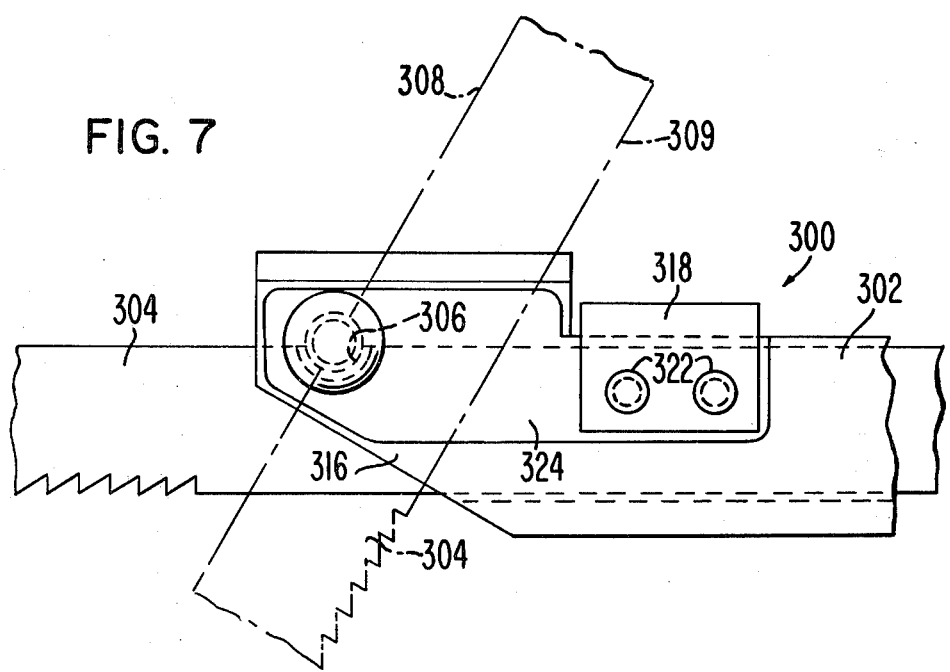
FIG. 7 is a side elevational view of another embodiment of the holder of this invention, showing the way in which a blade is moved into position on the holder.

The first embodiment of the saber saw blade holder of this invention is broadly denoted by the numeral 10 and is illustrated in FIGS. 1, 1a and 1b. Holder 10 is adapted to be mounted at the outer end of a reciprocating member 12 coupled to a drive means (not shown) so that holder 10 reciprocates to drive a saber saw blade back and forth to permit a cutting action by the blade.

Holder 10 includes a U-shaped support element 14 having a front section 16 provided with a vertical slot 18 (FIGS. 1a and 1b) therein. The slot extends across the top part 18 of support element 14 to a location 20 (FIG. 1). A cam member 22 projects upwardly through the top part of the slot and has a base 24 provided with a cam surface 26, base 24 having a bottom 28 which is slidably supported on a flat, upper surface 30 of a body 32 carried by a pair of machine screws 34 on support 14, screws 34 extending between front section 16 and rear section 36 of support element 14 as shown in FIG. 1. The body 32 also has a recess 38 for receiving a roller 40 which normally engages cam edge 26 and is forced downwardly toward the bottom of the recess. A coil spring 42 captured between top part 18 and body 32 as shown in FIG. 1 biases cam member 22 to the left in viewing FIG. 1, thereby biasing roller 40 downwardly.

Holder 10 is adapted to be used with a blade shown in dashed lines and denoted by the numeral 44, the blade having a notch 46 for receiving roller 40 when the blade is inserted in slot 18 through front section 16. The body 32 has an upper surface 46 and a lower surface 48 aligned with slot 18, and the top and bottom edges of blade 44 engage surface 46 and 48 when the blade is inserted in the holder. This assures that the blade will not pivot about roller 40 when the blade is inserted.

In use, with blade 44 removed, the blade can be inserted into the holder by manually shifting cam member 22 to the right when viewing FIG. 1. This will allow roller 40 to be raised in recess 38 when the blade is inserted in slot 18. The blade is forced into the slot until notch 46 is aligned with roller 40, then cam member 22 is released and spring 42 forces the cam member to the left when viewing FIG. 1 so that cam surface 26 engages roller 40 and forces it into notch 46 of the blade, thereby releasably connecting the blade to the holder. A sawing action can then commence by operating the drive means coupled with the drive member 12.

A second embodiment of the invention is broadly denoted by the numeral 50 and is shown in FIGS. 2,2a and 2b. Holder 50 includes a main body 52 and a front plate 54, plate 54 being connected by four screws 56 to main body 52 and spaced forwardly therefrom by spacers 58 on screws 56. This presents a gap 60 in which a rotatable member 62 is positioned, member 62 having a circular outer periphery 64 which is adjacent to and retained by spacers 58 as shown in FIG. 2a. Member 62 has an eccentric cam surface 66 aligned with a slot 68 in plate 54 and a slot 70 in body 52. Cam surface 66 extends across the slots 68 and 70 to retain a saber saw blade 71 therein with the surface 66 entering a groove 72 in the blade when the blade is inserted in the slots.

Member 62 is biased in a clockwise sense when viewing FIG. 2a by a coil spring 74 positioned in gap 60 and in a recess 76 in body 52. Spring 74 bears on a first lateral projection 78 at one side of member 62 to bias member 62 in a clockwise direction when viewing FIG. 2a. A second projection 80 of member 62 extends laterally from the gap 60 as shown in FIGS. 2a and 2b so as to permit manual rotation of member 62 in a counterclockwise sense to compress spring 74 and move surface 66 out of alignment with slots 68 and 70. This will allow blade 71 to be inserted into or taken out of the slots, whereupon the member 62 is released and again rotated in a clockwise sense by spring 74 until projection 7 is stopped by the adjacent spacer 58.

Holder 50 is coupled to a reciprocal drive member 82 which is driven by a drive means (not shown). The blade can be quickly and easily inserted into the holder or taken out of the holder merely by manipulating member 62.

A third embodiment of the holder of this invention is broadly denoted by the numeral 100 and includes a reciprocal member 102 having an end slot 104 for receiving a saber saw blade 106 having notches 108 and 110 in a side marginal edge 112. A block-like body 114 is secured in any suitable manner on the end of member 102. Body 114 has a first transverse bore 116 for shiftably receiving a cam member 118, a second transverse bore 120 for receiving a plug 122 and a coil spring 124, and a third transverse bore 126 for shiftably receiving a second cam member 128. Cam members 118 and 128 are substantially identical to each other in that they have conical cam surfaces 130 which increase in diameter from their centers outwardly. Cam surfaces 130 are generally above but can move across the top of the slot when the cam members move to the right when viewing FIG. 3b.

A first plate 132 is connected to first ends of members 118 and 128, and a second plate 134 is connected to the opposite ends of the cam members 118 and 128. The cam members are shiftable in respective bores 116 and 126 and coil spring 124 is normally under compression and biases the cam members to the right as a unit when viewing FIG. 3b.

In use, to insert blade 106 in the holder, manual finger pressure is exerted on plate 134, forcing cam members 118 and 128 to the left when viewing FIG. 3b. This forces cam surfaces 130 away from slot 104 and blade 106 can be inserted in the slot until notches 108 and 110 are aligned with surfaces 130. Then, plate 134 is released, allowing cam members 118 and 128 to move to the right when viewing FIG. 3b under the bias force of spring 124. This causes cam surfaces 130 to enter notches 108 and 110, thereby releasably retaining the blade in place. Then, the drive means coupled with member 102 can be actuated to cause reciprocation of the blade. The blade is removed from the holder by reversing the above process.

Another embodiment of the holder of this invention is broadly denoted by the numeral 150 and is shown in FIGS. 4,4a and 4b. Holder 150 is adapted to be coupled to the drive means 152 which reciprocates under the action of a drive motor (not shown) to, in turn, reciprocate the holder. A blade 154 is adapted to be used with holder 150, the blade having at least one notch 156 which receives a cam 158 on a cylindrical member 160 rotatably mounted in openings 162 and 164 (FIG. 4a) of a pair of spaced plate elements 166 and 168 forming parts of the main body of holder 150. A central plate element 170, spaced inwardly of plate elements 166 and 168, presents a relatively wide slot 172 for a wide blade and a relatively thin slot 174 for a thin blade. A second cam member 176 is mounted on a second roller 178 spanning the distance between and rotatably mounted on plate elements 166 and 168. The second cam 176 is used to engage the upper edge 154a of blade 154 to stabilize the blade and prevent it from pivoting about cam 158 when the blade is inserted in the holder.

Cam 176 could be used to enter a second notch of the blade if such notch were provided. Coil springs 180 bias cam members 158 and 176 in a clockwise direction when viewing FIG. 4. One end of each spring 180 is connected to an ear 182 (FIG. 4b) near the outer periphery of the corresponding roller 160 or 178. The opposite end of the spring is connected around a pin 184 extending through plate elements 166, 168 and 170.

In use, blade 154 is inserted into either slot 172 or 174 depending upon the width of the blade. As the blade is inserted, it engages first cam 176 to rotate it in a clockwise sense in viewing FIG. 4. Then it engages cam 158 to also rotate it in a counterclockwise direction until notch 156 becomes aligned with the cam member 158. Then cam member 158 enters the notch and secures the blade to the holder. Cam 176 stabilizes the blade and prevents it from moving about. To facilitate rotation of the cam members, thumb wheels 186 and 188 are coupled with the ends of rollers 160 and 178.

FIG. 5 shows another embodiment of the holder of this invention, broadly denoted by the numeral 200. Holder 200 includes a reciprocating member 202 coupled to a drive means (not shown) for reciprocating a blade 204 back and forth. The blade has a notch 206 which receives a leaf spring element 208 secured by fasteners 210 to an inclined surface 212 near one end of member 202. Member 202 has a slot 214 for receiving blade 204 and the blade can be forced into the slot, biasing spring element 208 upwardly when viewing FIG. 5 until notch 206 is aligned with spring element 208. Then, element 208 moves into the notch as shown in FIG. 5 to releasably hold the blade in place. The blade cannot move up and down when viewing FIG. 5 because the blade engages other parts of member 202 forming the slot. To remove the blade, spring elements 208 is moved upwardly by applying manual pressure to its outer tip 216, thereby lifting the element out of notch 206 and allowing the blade to be removed from slot 214.

Another embodiment of the invention is broadly denoted by the numeral 250 and is shown in FIGS. 6,6a and 6b. Holder 250 includes a reciprocating member 252 coupled to a drive means (not shown) for reciprocation. Member 252 is rectangular in cross-section as shown in FIG. 6b and shiftably mounts a rectangular sleeve 254 for movement between a first flange 256 at one end of member 252 and a stop flange 258 spaced from flange 256 as shown in FIGS. 6 and 6a. A coil spring surrounds members 252 and is under compression, the coil spring extending between flanges 256 and 258 and engaging a flange 260 on sleeve 254 to bias it to the left when viewing FIG. 6. Member 252 has a pair of side recesses which cooperate with sleeve 254 to present a wide slot 262 and a narrow slot 264 for receiving wide and thin blades, respectively.

In use, sleeve 254 is first moved to the right as shown in FIG. 6a against the bias force of spring 259 to expose the side recesses in member 252. Then, the thin or thick blade is put in the proper recess and sleeve 254 is released to close the recesses and to form the desired slot. The blade is then held in place and can be reciprocated by actuating the drive motor coupled with member 252. To remove the blade, the above process is reversed.

Figure 7A:
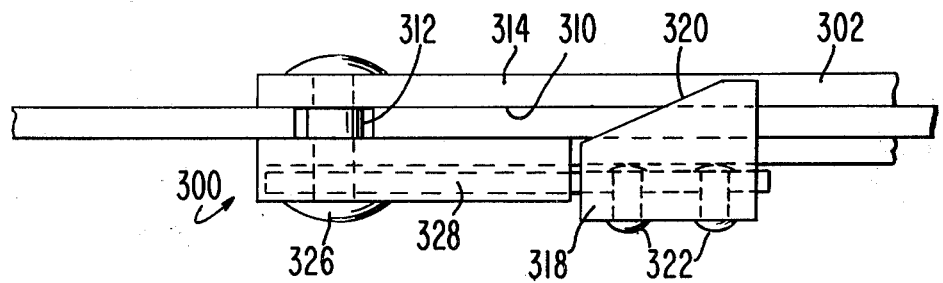
FIG. 7a is a top plan view of the holder of FIG. 7.
Figure 7B:
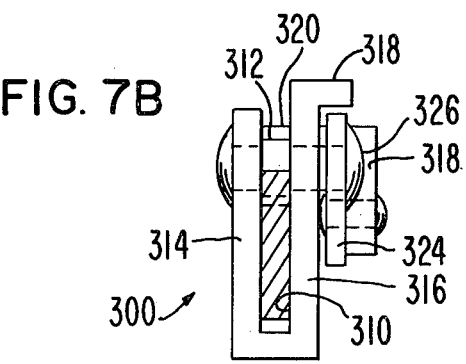
FIG. 7b is a front elevational view of the holder of FIG. 7.

Another embodiment of the holder of this invention is broadly denoted by the numeral 300 and is shown in FIGS. 7, 7a and 7b. Holder 300 includes a reciprocal member 302 adapted to be coupled to a drive means (not shown) for reciprocation to drive a saber saw blade 304 of the type having a notch 306 in one edge 308 thereof. Member 302 has a slot 310 extending from the front end thereof rearwardly and a cylindrical pin 312 spans a distance between the sides 314 and 316 of member 302 which define slot 310. Pin 312 defines a pivot means receivable in notch 306 when the blade is first inserted into the slot.

A cam member 318 having a cam edge 320 is secured by a pair of pins 322 to one side of a leaf spring element 324 secured to side 316 by the head 326 of pin 312. A flange 328 overlies spring element 324 and head 326.

In use, blade 304 is first inserted in slot 310 in the angled position shown in FIG. 7 until notch 306 is mounted for pivotally movement about pin 312. Then the blade is rotated in a clockwise sense when viewing FIG. 7, whereupon the bottom margin 309 of the blade engages cam edge 320, forcing cam members 318 away from side 316 by virtue of the resilience of leaf spring 324 until the blade is horizontally disposed as shown in FIG. 7. Then the cam member 318 snaps back and overlies the blade as shown in FIG. 7a. The member 30 can then be reciprocated by actuating the drive member coupled thereto. To remove the blade, member 318 is manually moved out of overlying relationship to the blade and then the blade is pivoted in a counterclockwise sense and then shifted out of the slot.

Figure 8:
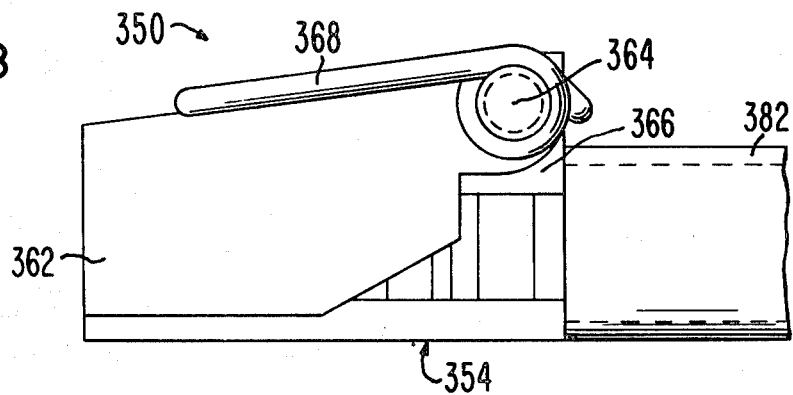
FIG. 8 is a side elevational view of another embodiment of the invention, showing the holder in a closed condition.
Figure 8A:
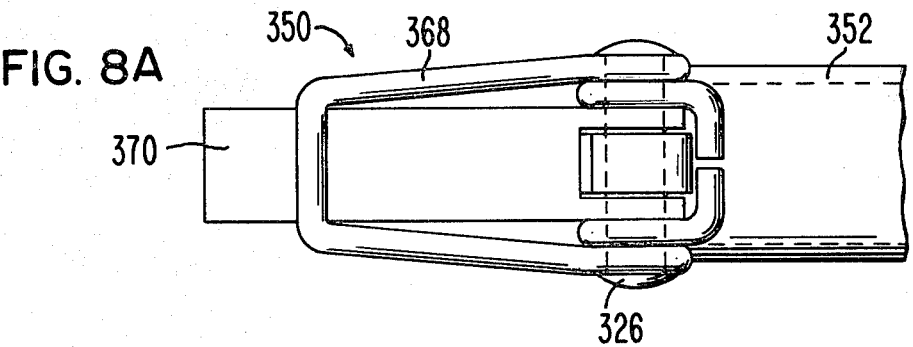
FIG. 8a is a top plan view of the holder of FIG. 8.
Figure 8C:
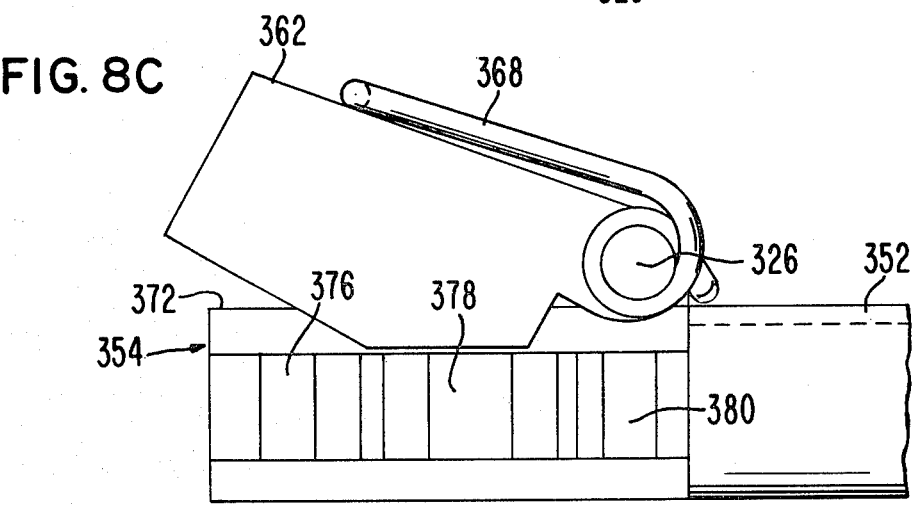
FIG. 8c is a view similar to FIG. 8 but showing the holder in an open condition.
Figure 8B:
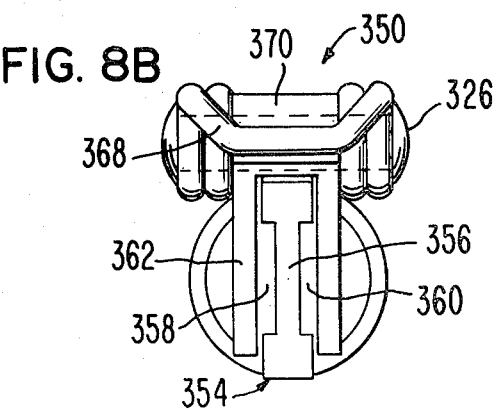
FIG. 8b is a front elevational view of the holder of FIG. 8.
Figure 8D:
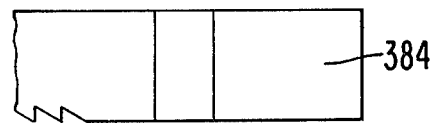
FIGS. 8d and 8e are two views of a saber saw blade to be used with the holder of FIG. 8.
Figure 8E:
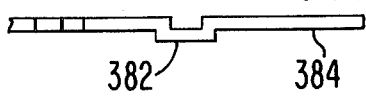

Another embodiment of the holder of the present invention is broadly denoted by the numeral 350 and is illustrated in FIGS. 8, 8a, 8b and 8c. Holder 350 includes a reciprocating member 352 having a front extension 354 provided with a reduced central section 356 which presents a wide slot 358 and a narrow slot 360 when a pivotal, U-shaped element 362 is in a closed condition over extension 354 as shown in FIGS. 8,8a and 8b. Element 362 is pivotally mounted by a pin 364 on the upper end 366 of extension 354, and a spring 368 carried by pin 364 engages the top 370 of element 362 and biases it in a counterclockwise sense when viewing FIG. 8. The inner surface of top 370 engages the upper marginal edge 372 (FIG. 8c) of extension 354 so as to limit the downward movement of element 362. The element is manually lifted into the position shown in FIG. 8c to allow a blade to be inserted in either of the recesses.

The extension 354 can have several slots 376, 378 and 380 therein at spaced locations along the same. These slots are provided to receive lateral projections of a blade to be mounted, such as projections 382 of a blade 384 so that the blade cannot shift longitudinally of its axis when the blade is in a respective slot of the holder and when element 362 is in the closed condition of FIG. 8. The blade need only have one such lateral projection 382 but it could have more than one, if desired. Moreover, the projections could be at different locations on the blade and the blade could be quickly and easily inserted in the holder.

In use, to insert a blade in the holder, element 362 is raised manually to expose the side recesses of extension 354. A blade is inserted into one or the other of the recesses with the lateral projection 382 of the blade extending into a corresponding slot 376, 378 or 380. Then element 362 is released and is moved back into the closed position by spring 368. The blade is then captured in the slot which is formed by the recess and element 362. Then, the drive means coupled with member 352 is actuated to reciprocate the blade. To remove the blade, the above process is reversed.

The embodiments of the holder of the present invention as set forth above provide a quick and easy way of mounting a saber saw blade for a cutting action. The holders of the invention require no special skills on the part of the user, and the holders can be suitable for use with different types of saber saw blades, even blades already made for other saber saw attachment devices.

I claim:

1. A holder for a saber blade comprising: a support having means defining a recess for receiving one end of a saber saw blade; and means shiftably mounted on the support for releasably holding the saber saw blade in the recess, the holding means including spring structure biasing the holding means into a blade holding position, the blade having a notch extending into the same from one marginal edge thereof, said support having a slot defining said recess, said support including a main body and a plate spaced forwardly from the body to form a gap, the body and the plate having aligned, respective slots therein defining said recess, said holding means including a cam member rotatably mounted in the gap and having an eccentric cam portion movable into an operative position in alignment with the slots in the body and the plate and thereby into the notch when the blade is in the slots, said spring structure biasing the cam portion into said operative position.

* * * * *